United States Patent
Shirato et al.

(10) Patent No.: US 6,774,971 B2
(45) Date of Patent: Aug. 10, 2004

(54) LCD WITH FLEXIBLE CONNECTING MEANS TO HARD TRANSPARENT CIRCUIT SUBSTRATE

(75) Inventors: Yasuyuki Shirato, Fukushima (JP); Hideki Kowata, Fukushima (JP); Akira Shigeeda, Fukushima (JP); Akihiko Ohta, Fukushima (JP)

(73) Assignee: Nanox Corporation, Fukushima (JP)

( * ) Notice: Subject to any disclaimer, the term of this patent is extended or adjusted under 35 U.S.C. 154(b) by 0 days.

(21) Appl. No.: 10/412,389

(22) Filed: Apr. 10, 2003

(65) Prior Publication Data

US 2003/0174272 A1 Sep. 18, 2003

Related U.S. Application Data

(63) Continuation of application No. PCT/JP01/11205, filed on Dec. 20, 2001.

(30) Foreign Application Priority Data

Jun. 8, 2001 (JP) ........................................ 2001-174736

(51) Int. Cl.$^7$ ............................................ G02F 1/1345
(52) U.S. Cl. ........................ 349/150; 349/149; 361/739
(58) Field of Search .............................. 349/149, 150; 361/739

(56) References Cited

U.S. PATENT DOCUMENTS

| | | | | |
|---|---|---|---|---|
| 3,900,722 A | * | 8/1975 | Cocharan et al. | 708/190 |
| 4,087,861 A | * | 5/1978 | Futagawa et al. | 708/139 |
| 4,892,999 A | * | 1/1990 | Wai-Kwan | 235/1 D |
| 5,398,128 A | * | 3/1995 | Tajima et al. | 349/150 |
| 5,436,744 A | * | 7/1995 | Arledge et al. | 349/150 |
| 5,963,287 A | * | 10/1999 | Asada et al. | 349/150 |
| 2002/0080315 A1 | * | 6/2002 | Tsai | 349/149 |

FOREIGN PATENT DOCUMENTS

| | | |
|---|---|---|
| JP | 03-054520 | 3/1991 |
| JP | 06-018875 | 1/1994 |
| JP | 07-056186 | 3/1995 |
| JP | 08-297293 | 11/1996 |
| JP | 10-112584 | 4/1998 |
| JP | 2001-051257 | 2/2001 |

* cited by examiner

Primary Examiner—Dung T. Nguyen
Assistant Examiner—Andrew Schechter
(74) Attorney, Agent, or Firm—Intellectual Property Law Group LLP; Otto O. Lee; Juneko Jackson (57) ABSTRACT

With the embodiment of the present invention, a liquid crystal display can be produced at a low cost, which employs the COG technology, saves installation space, mounts LSIs, and, after the LSIs are mounted, can visibly check and inspect the mounted state thereof (that is, electrically connected states thereof) and lighting of the image displaying portion. The liquid crystal display is provided with a liquid crystal displaying portion 11 in which a surface glass substrate 9 having an electrode secured therein and a rear glass substrate 10 having a transparent electrode opposite thereto provided therein are overlapped so that both of the substrates 9 and 10 are opposed to each other, and liquid crystal is sealed in pixel areas between the substrates 9 and 10; and an FPC 7 that is provided with a circuit substrate portion 7 including a LSI 5 which is incorporated on the surface of the glass substrate 3 having a transparent conductive electrode 2 provided therein and is connected electrically to the electrodes, and electrically connects respective electrodes of the liquid crystal displaying portion 11 and circuit substrate portion 6, wherein the FPC 7 is folded over to overlap the liquid crystal displaying portion 11 and the circuit substrate portion 6.

9 Claims, 11 Drawing Sheets

Prior Art

LCD WITH FLEXIBLE CONNECTING MEANS TO HARD TRANSPARENT CIRCUIT SUBSTRATE

CROSS REFERENCE

This is a continuation of International Application PCT/JP01/11205, with an international filing date of Dec. 20, 2001, which is hereby incorporated by reference.

BACKROUND OF THE INVENTION

1. Technical Field Of The Invention

The present invention relates to a liquid crystal display and a method for producing the same.

2. Prior Art

Conventionally, a COG (chip-on-glass) module and a COF (chip-on-film) module have been publicly known as liquid crystal displays.

Figure 11:
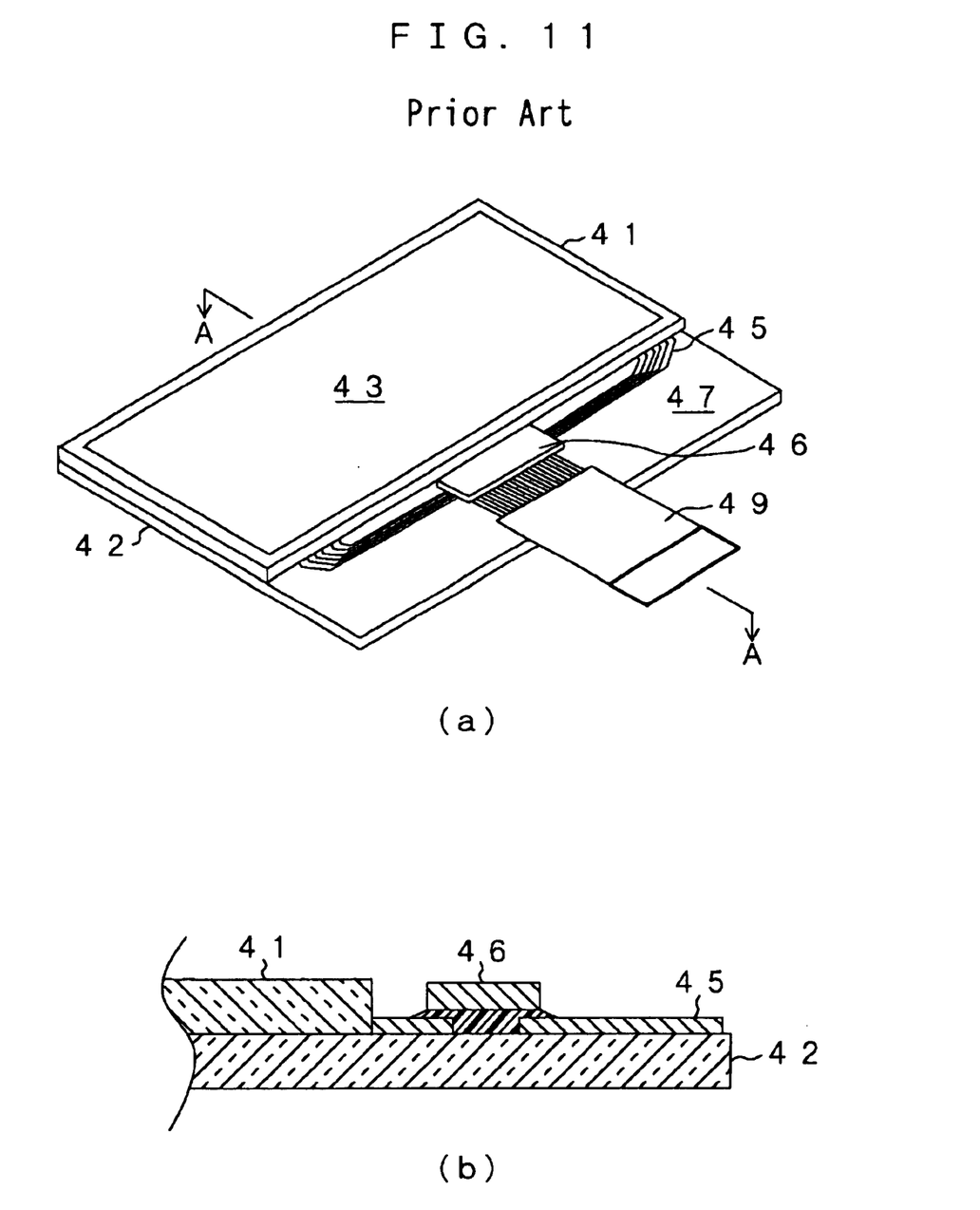
FIG. 11(a) is a plan view showing a prior art COG module.
FIG. 11(b) is a sectional view taken along the line A—A in FIG. 11(a)

FIG. 11 shows a configuration of a COG module (wherein FIG. 11(a) is a plan view and FIG. 11(b) is a view taken along the line A—A of FIG. 11(a)). The COG module shown in FIG. 11 is composed of a liquid crystal displaying portion 43 that is obtained by overlapping a surface substrate 41 and a rear substrate 42, to each of which conductive line (not illustrated) constituting a transparent pixel electrode 45 is applied, and sealing liquid crystal in pixel areas sectioned by sealing agents between the corresponding substrates 41 and 42; and a circuit substrate portion 47 in which an LSI (IC) 46 connected electrically to the above-described transparent pixel electrode 45 is connected to an area in which terminals of the above-described transparent pixel electrodes 45 is provided on the surface substrate 41 or the rear substrate 42, and a plurality of conductive lines of these transparent electrode 45 are integrated.

Transparent resin and transparent glass are used as the above-described surface and rear substrates 41 and 42. However, since, in many cases, glass is employed, areas to which the LSI 46 is connected are provided on a glass substrate. Therefore, there may be cases where a liquid crystal display consisting of the above liquid crystal displaying portion 43 and circuit substrate portion 47 is called a "chip-on-glass" module.

The COG module employs a flexible cable such as FPC 49 as a cable for connection from a conductive line of the LSI 46 to the power source (not illustrated) side.

Figure 12:
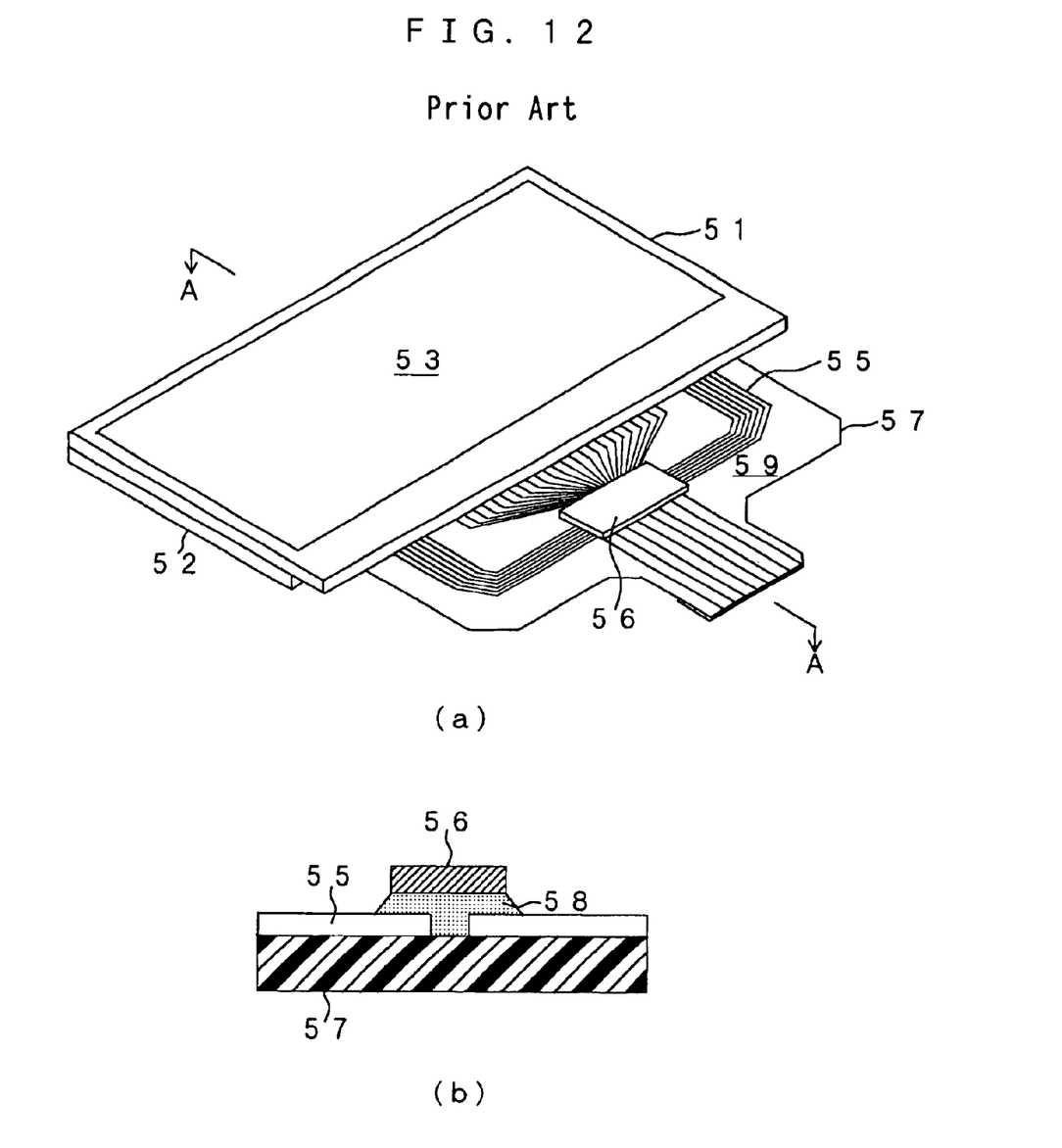
FIG. 12(a) is a plan view showing a prior art COF module.
FIG. 12(b) is a partially sectional view taken along the line A—A in FIG. 12(a)

Also, the liquid crystal display in which the COF is used is shown in FIG. 12 (wherein FIG. 12(a) is a plan view, and FIG. 12(b) is a sectional view taken along the line A—A in FIG. 12(a)). The COF module is composed of a liquid crystal displaying portion 53 in which a surface substrate 51 and a rear substrate 52 having conductive line, which constitutes a transparent electrode, applied thereto are, respectively, overlapped with each other, and liquid crystal is poured and sealed in pixel areas sectioned by a sealing agent between both of the corresponding substrates 51 and 52; and a circuit substrate portion 59 that forms conductive lines 55 of metallic copper, connected to conductive lines from the corresponding liquid crystal displaying portion 53, on a circuit substrate 57 made of synthetic resin film such as expensive polyimide resin, etc., and connects an LSI (IC) 56, which is connected electrically to the transparent pixel electrode of said liquid crystal displaying portion 53, to an area in which the above-described conductive lines 55 of metallic copper are integrated.

The conductive lines of the LSI (IC) 56 on the above-described circuit substrate portion 59 are configured so as to be connected to the power source side via an anisotropic conductive film (not illustrated), etc. However, in the configuration shown in FIG. 12, since the LSI 56 is provided on a synthetic resin film, the same may be called a "chip-on-film" module.

Figure 13:
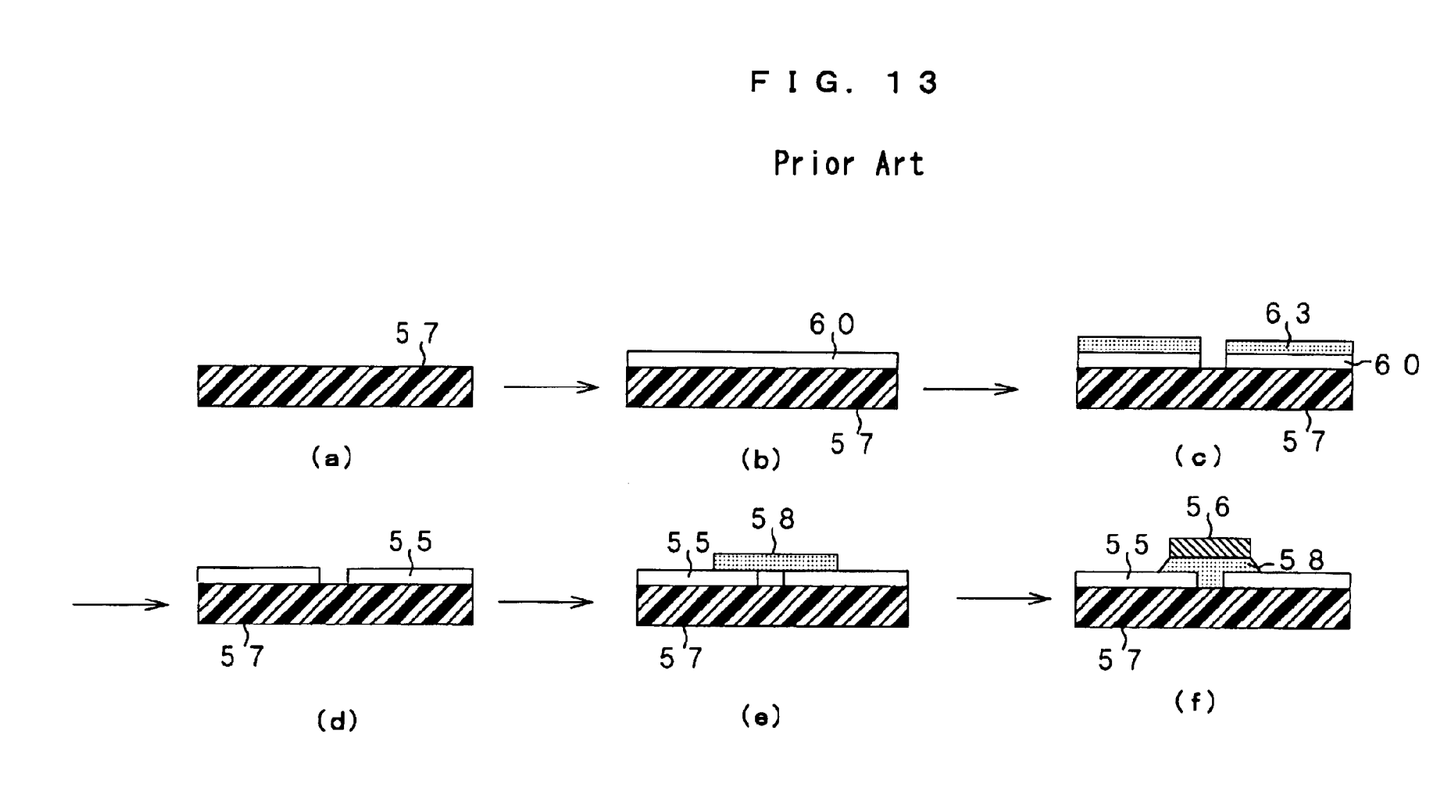
FIG. 13 is a process view describing a sequence of incorporating LSIs in a prior art COF.

In the liquid crystal display constructed as shown in FIG. 12, the LSI (IC) 56 is connected to the conductive lines in the order shown in FIG. 13. First, as shown in FIG. 13(a), a copper foil 60 is adhered to the surface of the circuit substrate 57 (FIG. 13(b)), the same is etched after a masking agent 63 is coated (FIG. 13(c)), and a pattern of copper conductive lines 55 is formed. Next, an ACF (Anisotropic Conductive Film) 58 is adhered to the pattern of the etched copper conductive lines 55 (FIG. 13( )), and the LSI (IC) 56 is thermally pressure-fitted from above the ACF 58 (FIG. 13(f)).

In the configuration of the COG module shown in FIG. 11, since the liquid crystal displaying portion 43 and the circuit substrate portion 47 are provided on the rear substrates 41 and 42, the area of the circuit substrate portion 47 in which the LSI 46 of the COG module is mounted is increased, the area occupied by the circuit substrate portion 47 is increased in comparison with the liquid crystal displaying portion 43 that brings about its inherent features and functions as a liquid crystal display. Since the FPC 49 that is a flexible cable is disposed on the surface of the rear substrate 42, the flexible property of the FPC 49 cannot be completely displayed, and since the circuit substrate portion (LSI-mounted part) 47 is provided on a glass substrate together with the liquid crystal displaying portion 43, it is not possible to fold the circuit substrate portion 47.

Also, in the configuration of the COF module, which is shown in FIG. 12, in order to form conductive lines 55, having a minute thickness, of non-transparent copper on the circuit substrate 57 made of polyimide resin film being a flexible film as shown in FIG. 13, the cost of producing a mask to form conductive lines, and the cost for inspection of connecting electrically to the conductive lines after the conductive lines are formed are incidentally increased. In addition, since polyimide resin is expensive, and the product cost will be accordingly increased, which cannot be ignored as a problem.

Further, the circuit substrate 57 that is composed of copper conductive lines 55 and a polyimide resin film is non-transparent as shown in FIG. 13(f), and there is a shortcoming by which the connected state between the copper conductive lines 55 and LSI 56 cannot be visibly confirmed.

Thus, since the COF module employs a number of production steps and uses expensive materials, there are many cases where the development costs cannot be depreciated in a case of producing custom products in a small lot.

Also, in the COF module shown in FIG. 12, it is necessary to prepare a photo mask to produce a circuit substrate portion 57 for connection of the LSI 56, a metal mold for cutting the outer profile thereof, and special tools and fixtures to fix a soft polyimide resin film, and high initial costs are required. Also, since expensive ultra-thin polyimide films and ultra-thin copper foils 60 are used as the materials of the circuit substrate 57, the unit price thereof is very expensive. In addition, since the circuit substrate materials and circuit conductive lines are not transparent, it is not possible to visibly check the connected state of the LSI 56 when it is mounted on the circuit substrate portion 57.

SUMMARY OF THE INVENTION

Therefore, it is an object of the present invention to provide a liquid crystal display that employs the COG technology, is able to mount LSIs in a narrow space and, after the LSIs are mounted, to visibly check the mounted state (that is, its electrically connected state) and the lighting of a picture displaying portion, and a method for producing the same. Also, it is another object of the invention to provide a liquid crystal display that has high reliability and whose production cost is lower, and a method for producing the same.

These objects of the invention can be achieved and solved by the following configurations (1) and (2):

(1) A liquid crystal display comprising: a liquid crystal displaying portion in which a first substrate having a transparent pixel electrode provided thereon and a second substrate having a transparent opposed pixel electrode provided thereon overlaps each other so that both the above-described electrodes are disposed so as to be opposed to each other, and liquid crystal is sealed in a pixel area between the above-described first substrate and the above-described second substrate; a hard transparent substrate having a transparent conductive electrode provided thereon; a circuit substrate portion that is mounted on the surface of the above-described hard transparent substrate and is provided with integrated circuit chips connected electrically to the above-described transparent conductive electrode; and flexible connecting means for electrically connecting the transparent pixel electrode of the above-described liquid crystal displaying portion with the transparent conductive electrode of the above-described circuit substrate portion.

In the liquid crystal display of the COF module type, which is a prior art and is shown in FIG. 12, the LSI 56 is bonded to the circuit substrate 57 made of non-transparent polyimide resin film. However, according to the above-described invention, integrated circuit chips are bonded on a hard transparent substrate, which is a hard material. Thus, since the integrated circuit chips are bonded on a hard substrate, work can be facilitated, and, in comparison with bonding of integrated circuit chips on a non-transparent film as in the prior arts, it is possible to visibly check the bonding conditions of the integrated circuit chips from the surface of the hard transparent substrate at the side where no integrated circuit chip of the transparent substrate is mounted. Therefore, no expensive checking apparatus is required, and this is advantageous.

In addition, in comparison with the COF module type in FIG. 12, it is possible to produce liquid crystal displays at a low cost since the liquid crystal displays according to the invention do not use any expensive polyimide resin.

Also, since the liquid crystal displaying portion and the circuit substrate portion of the above-described liquid crystal display according to the invention can be disposed so that the middle portion of the flexible connecting means is folded over, the liquid crystal display can be made compact.

In comparison with a liquid crystal display of COG module type, which is shown in FIG. 11 and belongs to the prior arts, since the circuit substrate portion can be folded over in the above-composed liquid crystal display according to the invention, the area occupied by the liquid crystal displaying portion in the entire liquid crystal display can be increased.

Also, in the above-described liquid crystal display according to the invention, it is preferable that the surface on which integrated circuit chips of the above-described circuit substrate portion are mounted is disposed at the position opposite to the above-described liquid crystal displaying portion.

Where the surface on which integrated circuit chips of the above-described circuit substrate portion are mounted is disposed at the position opposite to the above-described liquid crystal displaying portion, since the integrated circuit chips are not exposed from the substrate surface, it is possible to prevent the integrated circuit chips from being influenced by an external impact when a liquid crystal display is set in a casing.

Further, any one of a flexible printed circuit (FPC), a heat seal, a flexible flat cable (FFC), and an anisotropic conductive rubber connector may be used as the above-described flexible connecting means of the invention.

By connecting the liquid crystal displaying portion and circuit element portion to each other via the flexible connecting means, and causing the flexible connecting means to be folded over, the liquid crystal display portion and circuit element portion are caused to overlap each other, wherein a space-saving liquid crystal display can be obtained.

The first substrate, second substrate and hard transparent substrate of the above-described liquid crystal display according to the invention may be made of a transparent glass plate or transparent synthetic resin plate.

At this time, since the plate thicknesses of the first and second substrates and the hard transparent substrate are made the same, it is possible to obtain a number of the above-described three substrates from a single transparent plate having a large area, wherein the productivity thereof is made higher than in the case where the above respective substrates are separately produced.

Also, it is highly recommended that an infrared ray shielding film be coated onto the surface of the hard transparent substrate other than the portion where the above-described integrated circuit chips are mounted. With the construction, it is advantageous in that a liquid crystal display (for example, of a portable device), which is used outdoors and may be exposed to sunlight does not erroneously operate.

(2) A method for producing a liquid crystal display in which a first substrate having a transparent pixel electrode provided thereon and having a sealing agent, which sections the pixel area, coated thereon, and a second substrate having a transparent opposed pixel electrode provided thereon are disposed so that both the above-described electrodes face each other, and liquid crystal is sealed in respective pixel areas between the above-described first substrate and the above-described second substrate to make the same into a liquid crystal portion; integrated circuit chips connected electrically to a transparent conductive electrode are mounted on the surface of the hard transparent substrate having the above-described transparent conductive electrode provided thereon to make the same into a circuit substrate portion; and the transparent conductive electrode of the above-described circuit substrate portion and the transparent pixel electrode of the above-described liquid crystal displaying portion are electrically connected to each other by flexible connecting means; comprising the steps of: producing a single transparent substrate having a large area, which is constructed of a plurality of sets disposed in one or more rows each set consisting of the above-described first substrate portion, the above-described hard transparent substrate portion and the above-described second substrate portion arrayed in this order; overlapping the first substrate portion, hard transparent substrate portion and second substrate portion of the above-described respective sets so as to be disposed in the opposite direction, using two of the above-described transparent substrates having a large area; forming a liquid crystal displaying portion area having a liquid crystal-sealed space, which is composed of the first substrate portion, the second substrate portion and a sealing agent, formed therein, the above-described liquid crystal displaying portion being disposed at the position where the above-described overlapped two transparent substrates having a large area are faced to each other; forming a circuit substrate portion area in which integrated circuit chips are mounted on the hard transparent substrate portion adjacent to the above-described liquid crystal displaying portion area; and acquiring a plurality of units for producing a liquid crystal display by cutting and separating the above-described two transparent substrates having a large area, in which a plurality of units for producing a liquid crystal display, consisting of the above-described acquired liquid crystal displaying portion area and the above-described circuit substrate portion area are arrayed.

In the above-described method for producing a liquid crystal display, the above-described step for cutting and separating two overlapped transparent substrates having a large area may further comprise the step of primarily cutting and separating the above-described plurality of units for producing liquid crystal displays row by row, each row having a plurality of units, respectively, and secondarily cutting and separating one row, which is cut and separated by the above-described primary cutting and separating step, unit by unit, each unit being for producing respective liquid crystal displays.

Also, liquid crystal may be poured and sealed in respective liquid crystal displaying portion areas in a plurality of units for producing liquid crystal displays in the respective rows in order to obtain liquid crystal displaying portions after the above-described primary cutting and separating step, and the above-described secondary cutting and separating step may be carried out thereafter.

In addition, integrated circuit chips connected electrically to the transparent conductive electrodes are mounted on the surface of the hard transparent substrate after the above-described secondary cutting and separating step, thereby making the same into a circuit substrate portion.

Still further, the liquid crystal displaying portion of the respective units for producing liquid crystal displays, which is provided with a circuit substrate portion incorporating integrated circuit chips after the above-described secondary cutting and separating step and the circuit substrate portion may be cut and separated from each other, and thereafter, the conductive end portions from respective electrodes of the corresponding liquid crystal portion and circuit substrate portion may be electrically connected to each other by a flexible connecting means to obtain a liquid crystal display, whereby the liquid crystal displaying portion and the circuit substrate portion may be disposed after they are folded over via the flexible connection means and overlapped with each other.

There are three types of shapes of transparent electrodes in the liquid crystal display according to the invention. However, with the method for producing the liquid crystal display according to the invention, it is possible to produce these transparent electrodes through a single process of photolithography by using a single masking substrate. That is, in the prior art method, one or two masks are required for the first and second substrates for a liquid crystal displaying portion, and one mask that is necessary for a circuit substrate portion is required, wherein two or three masks are requisite in all. However, in the present invention, using a single transparent substrate having a large area, the above-described three types of transparent electrodes can be formed at one time, wherein only a single mask is required.

Therefore, the exposure process and patterning process can be reduced to half or less. In addition, where the liquid crystal display portion area and circuit element portion area are produced with a single transparent substrate (glass, etc.), the circuit element portion can be produced in the same process order simultaneously as in the process of producing a liquid crystal displaying portion immediately before mounting the integrated chips of the circuit element portion.

Also, the liquid crystal displaying portion area and circuit element portion area are simultaneously produced in the same process order by using two transparent substrates having a large transparent substrate. After that, since the primary cutting and separating step for cutting and separating respective rows including a plurality of units for producing liquid crystal displays in a line is carried out, and a plurality of units for producing liquid crystal displays can be obtained at one time after the primary cutting and separating process, the productivity of the liquid crystal displays can be increased.

Also, where liquid crystal is sealed in a plurality of units for producing liquid crystal displays after the above-described primary cutting and separating process, it is possible to seal liquid crystal in a number of the above-described units with a single operation, wherein work efficiency can be increased.

Also, since it is possible to bond integrated circuit chips onto hard transparent substrates of a plurality of units for producing liquid crystal displays after the above-described secondary cutting and separating step, and it is possible to easily and securely inspect the electrical connections to the transparent conductive electrodes on the hard transparent substrates of integrated circuit chips, and it is possible to simultaneously check the lighting of a plurality of liquid crystal display units of the integrated circuit chips.

Therefore, according to the liquid crystal display of the invention, since the LSI-mounted portion can be disposed on the rear side of the liquid crystal displaying portion where the circuit substrate portion is connected to the liquid crystal displaying portion by a flexible connecting means, a compact liquid crystal display can be obtained.

Also, according to the method for producing a liquid crystal display of the invention, a plurality of sets of a liquid crystal displaying portion area and a circuit substrate portion area can be produced from a single transparent substrate having a large area, and three types of transparent conductive lines can be produced with a single masking substrate through a one-time photolithography process. Also, after the liquid crystal displaying portion and circuit element portion can be simultaneously produced by the same process order by using two transparent substrates having a large area, respective rows including a plurality of units for producing liquid crystal displays in a line are, respectively, cut and separated. After that, secondary cutting and separation are carried out, wherein a plurality of units for producing a liquid crystal display can be produced at one time, and productivity of the liquid crystal displays can be increased.

Thus, material costs are made lower than that of the COF, wherein the liquid crystal display according to the invention can be obtained at a low cost, and since the development costs of a liquid crystal display according to the invention are cheap, the invention can satisfactorily meet a request for custom displays in a small production lot.

Still further, since the LSI mounted portion (circuit substrate portion) is transparent, the electrode thereof is transparent, and the LSI is cemented to the transparent substrate by a binder, the connected state of the conductive lines of the LSI mounted portion can be visibly checked, wherein it is possible to check the conductive-connected portion (connection portion between the circuit substrate portion and liquid crystal portion) of the LSI mounted portion for which yield may be the most deteriorated during production, and a liquid crystal display having high reliability can be obtained.

Also, in the prior art shown in FIG. 12, not only is the circuit substrate 57 consisting of a polyimide resin film particularly expensive, but also the workability of mounting a hard LSI 56 onto the circuit substrate 57 made of soft polyimide resin film is difficult. However, according to the method of the invention, a hard. LSI 5 may be only mounted on a hard transparent substrate 3, wherein handling of the parts can be facilitated, a fully automated process is enabled, and the productivity thereof can be increased.

DETAILED DESCRIPTION OF SPECIFIC EMBODIMENTS

A description is given of embodiments of the invention with reference to the accompanying drawings.

Figure 2:
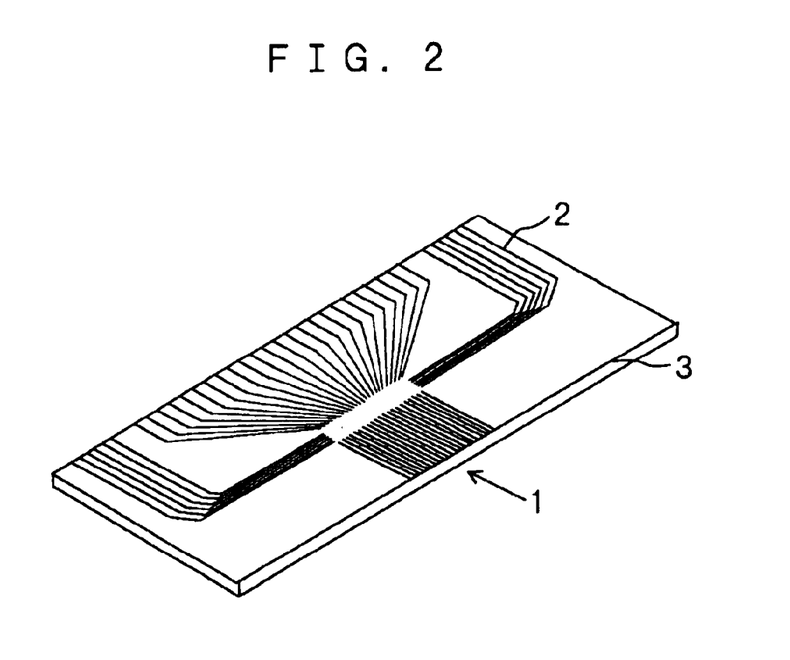
FIG. 2 is a perspective view of a COG stick substrate in which LSI input and output conductive lines of a liquid crystal display according to the embodiment of the invention are formed.
Figure 3:
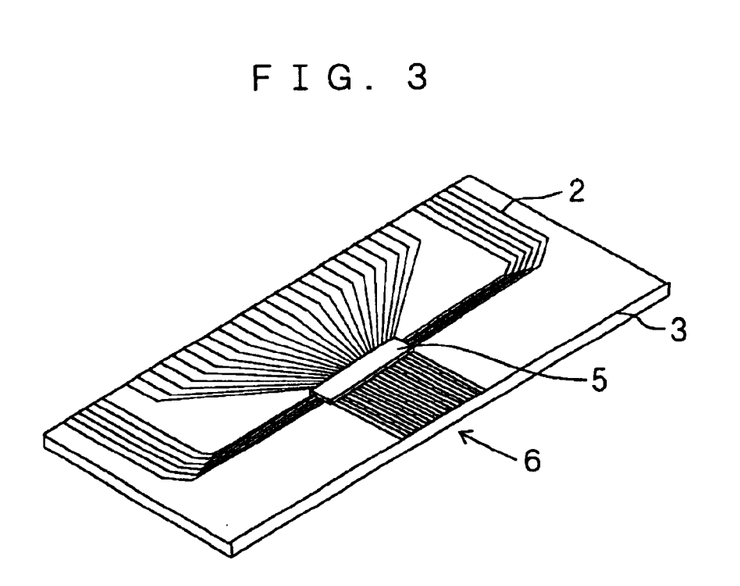
FIG. 3 is a perspective view showing a circuit substrate portion (COG stick) that is obtained by mounting LSIs on the COG stick substrate of the liquid crystal display according to the embodiment of the invention.

As shown in FIG. 2, conductive line of a transparent conductive electrode 2 is formed on a transparent substrate 3 by a photolithography method, and a COG stick substrate 1 on which LSI input and output conductive lines are formed is produced on the transparent substrate 3 with transparent electrodes. As shown in FIG. 3, an LSI 5 is mounted on the COG stick substrate 1 by an ACF system described later, and a circuit substrate portion (COG stick) 6 is produced. In this connection, as shown in FIG. 9, FPC (Flexible Print Circuits) 7 are connected to the input side terminal of the LSI 5 of the circuit substrate portion 6.

Figure 9:
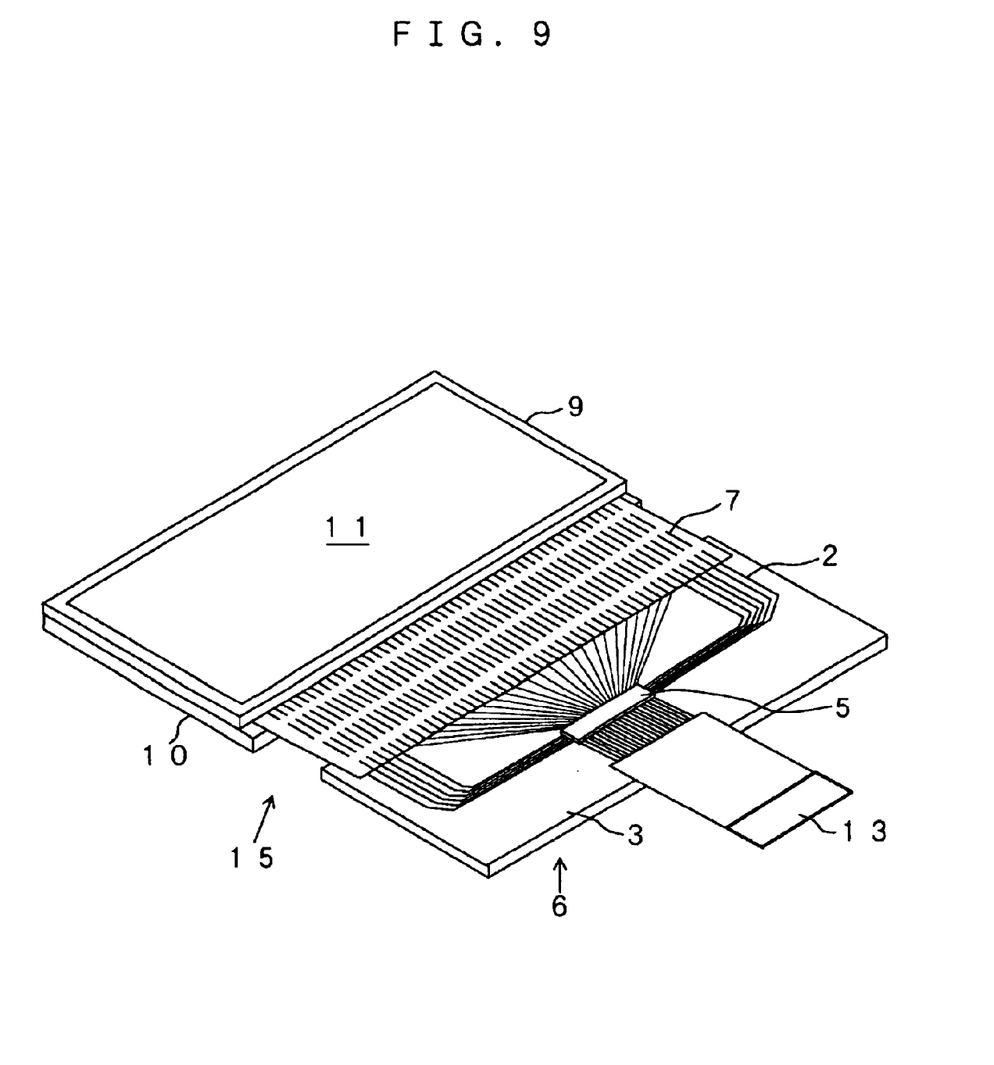
FIG. 9 is a perspective view showing a liquid crystal display according to the embodiment of the invention.

Also, a liquid crystal displaying portion 11 is produced in advance, in which a surface glass substrate 9 having the transparent pixel electrode shown in FIG. 9 provided therein and a rear glass substrate 10 having a transparent pixel electrode opposite thereto provided therein are overlapped each other so that both of the above-described electrodes are disposed so as to be opposed to each other, and liquid crystal is sealed in respective pixel areas between the above-described surface glass substrate 9 and rear glass substrate 10, and the electrode terminal and FPC 7 are connected to each other, wherein a liquid crystal display 15 is obtained.

Further, it is preferable that a light polarizing plate is arranged on the surface of the surface glass substrate 9, and a flexible cable 13 for connection to the power source side is connected to the terminal opposite to the connection portion of the circuit substrate portion 6 with the terminal of the LSI 5.

Figure 1:
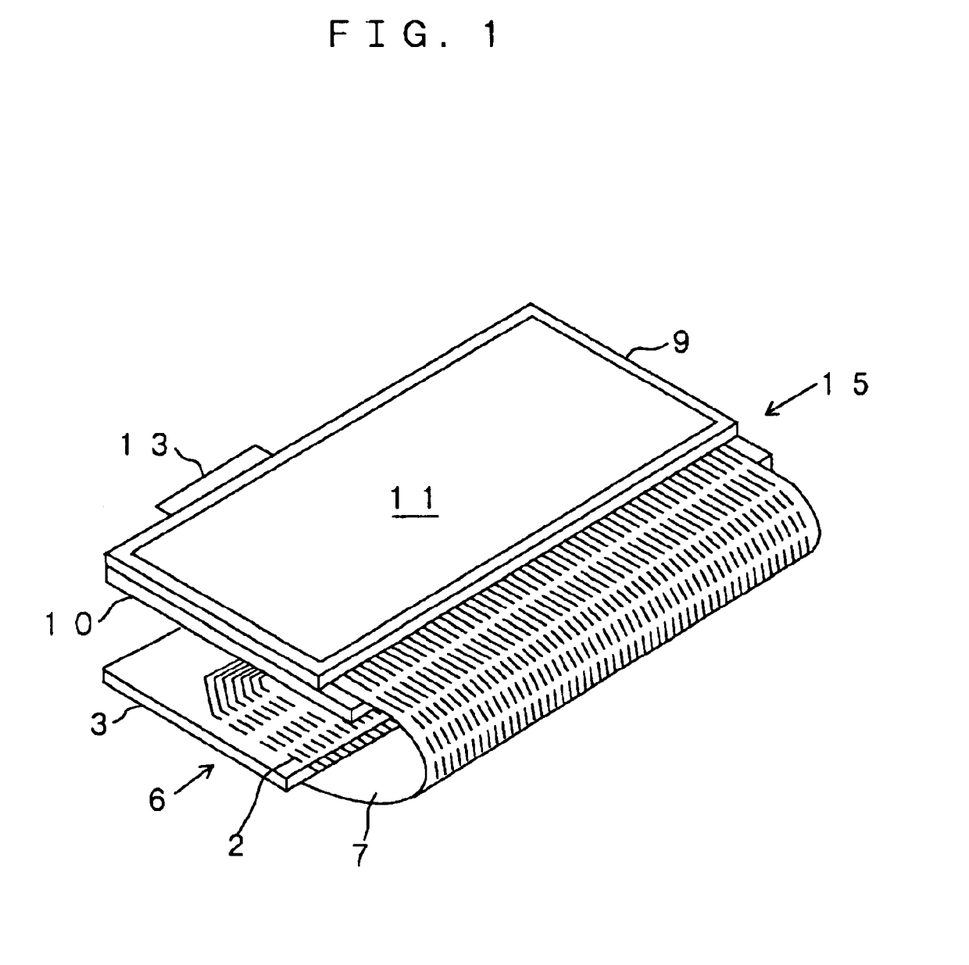
FIG. 1 is a perspective view of a liquid crystal display in which the liquid crystal display according to the embodiment of the invention is folded over at the FPC portion.

In the liquid crystal display 15 shown in FIG. 9, since the FPC 7 that connects the circuit substrate portion 6 and the liquid crystal displaying portion 11 to each other can be folded over, a compact liquid crystal display 15 can be obtained if the circuit substrate portion 6 that is the mounted portion of the LSI 5 and the liquid displaying portion 11 are overlapped to each other in a state where, as shown in FIG. 1, the surface glass substrate 9 is disposed outside.

Where the transparent conductive electrode 2 is further formed on the corresponding glass substrate by using a transparent glass substrate as the transparent substrate 3 of the circuit substrate portion 6, it is possible to visibly inspect the connected conditions between the LSI 5 and the transparent conductive electrode 2 from the surface of the transparent substrate 3 opposite to the LSI mounted portion by a microscope, etc., or an image recognition device, after the LSI 5 is mounted on the circuit substrate portion 6 via an ACF(Film consisting of the binder 23 and the conductive beads 26).

Figure 10:
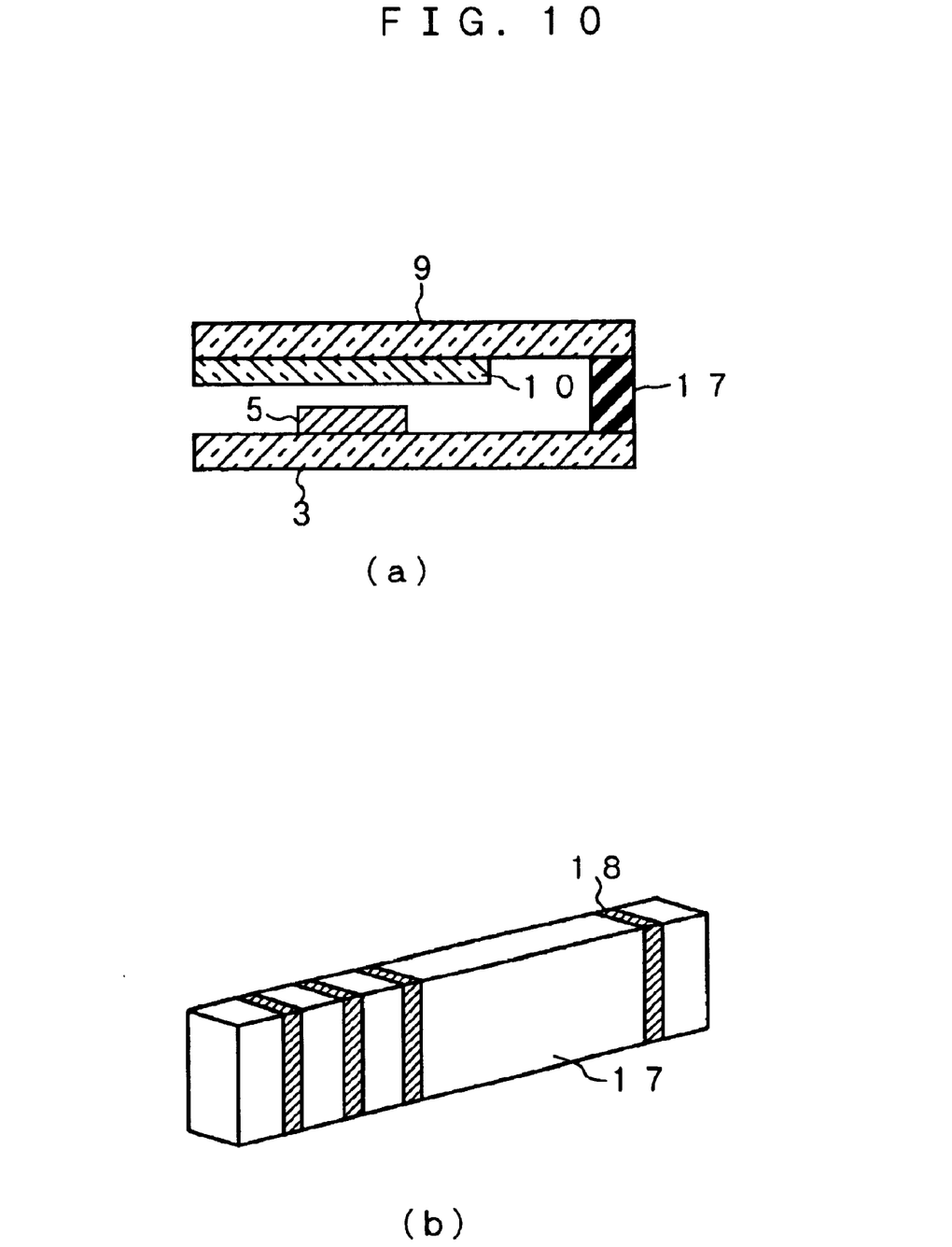
FIG. 10(a) is a sectional view showing a liquid crystal display according to the embodiment of the invention.
FIG. 10(b) is a perspective view of an anisotropic conductive rubber connector.

In regard to the connection between the circuit substrate 6 and the liquid crystal displaying portion 11, a rigid connection terminal such as a lead frame and an anisotropic conductive rubber connector 17 shown in FIG. 10 (wherein FIG. 10(a) is a sectional view of the liquid crystal display, and FIG. 10(b) is a perspective view of an anisotropic conductive rubber connector) may be used instead of using a flexible cable such as an FPC 7, etc. In the anisotropic conductive rubber connector 17, a conductive lines 18 composed of carbon grains, silver grains, etc., is incorporated like stripes as shown in FIG. 10(b).

Figure 4:
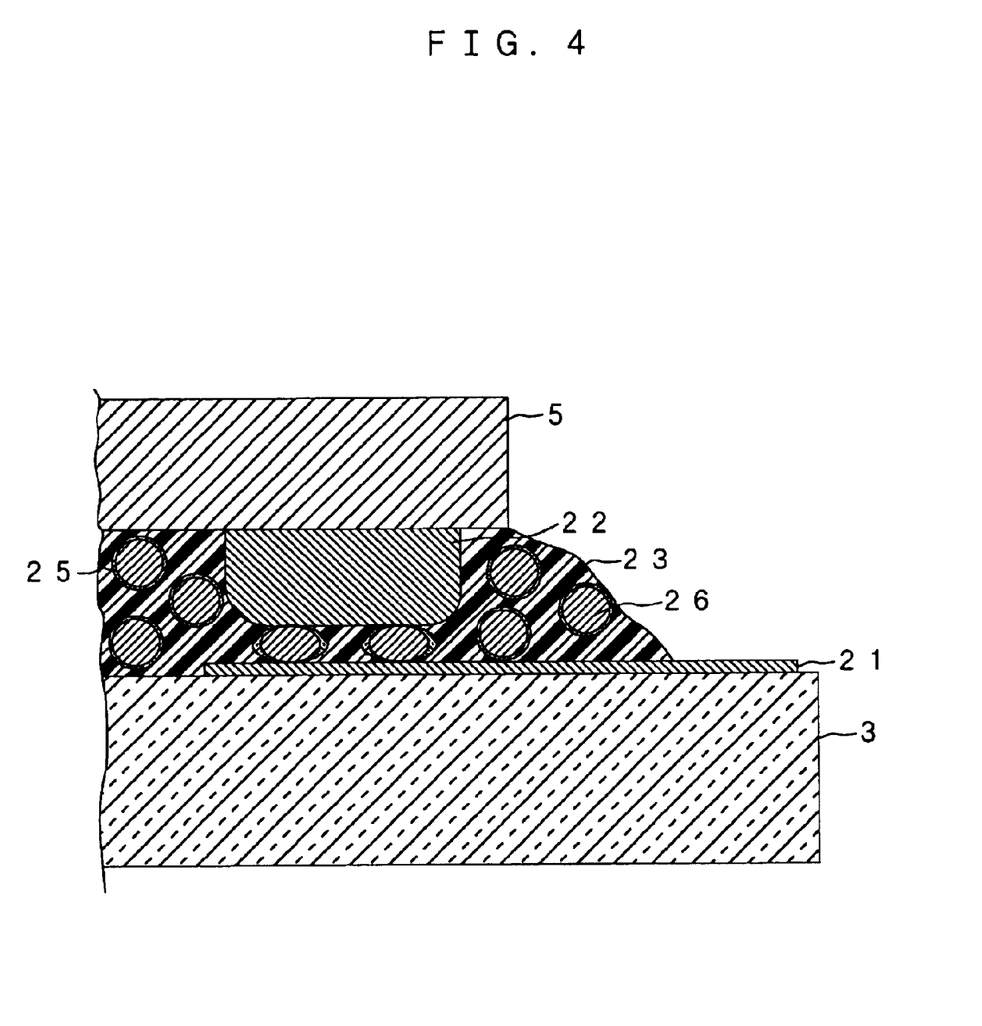
FIG. 4 is a partially sectional view showing a circuit substrate portion in which the LSIs of a liquid crystal display according to the embodiment of the invention are provided on a transparent substrate, and are connected to the ACF.

Herein, FIG. 4 shows a partially sectional view of the circuit substrate portion 6 that is provided via an ACF (Anisotropic Conductive Film) on an ITO 21, etc., in which the LSI 5 is secured on the transparent substrate 3. Since a gold bump 22 is provided in advance on the underside of the LSI 5, the gold bump 22 is placed on the surface of the transparent substrate 3 with the ITO 21. At this time, a binder 23 composed of an organic compound is coated on the surface of the transparent substrate 3 with a pattern of the ITO 21, and a number of conductive beads 26 whose outer periphery is coated with an insulation film 25 are included in the binder 23.

Therefore, if the LSI 5 is pressed to the transparent substrate 3 with the ITO 21 with the gold bump 22 faced downward, the conductive beads 26 in the organic binder 23, which are provided right below the gold bump 22, are collapsed, wherein only the portions in which the insulation film 25 is broken are electrically connected to the gold bump 22.

And, there are conductive line of the transparent substrate 3 and transparent ITO 21 in the LSI-mounted portion. When the LSI 5 is mounted (not after production of the liquid crystal display 15 is completed), it becomes possible to visibly and easily inspect the bonding conditions of the LSI 5 onto the conductive line of the ITO 21 through the conductive lines of the above-described transparent substrate 3 and transparent ITO 21. Also, lighting of the liquid crystal displaying portion 11 can be simultaneously checked at this time.

Therefore, since it is possible to check the conductive line-connected portion of the LSI-mounted portion of the circuit substrate portion 6, whose yield may be the most deteriorated, before completion of products, defective articles can be excluded early, wherein it is possible to provide a high quality liquid crystal display having high reliability without wastefulness.

Also, in the prior art shown in FIG. 12, not only is the circuit substrate 57 made of polyimide resin film particularly expensive, but also it is difficult to mount a hard LSI 56 onto the circuit substrate 57 made of soft polyimide resin film. However, in the method according to the present invention, since only a hard LSI 5 may be mounted on a hard transparent substrate 3, it becomes easy to handle parts, wherein fully automated handling is enabled, and productivity can be increased.

Figure 5:
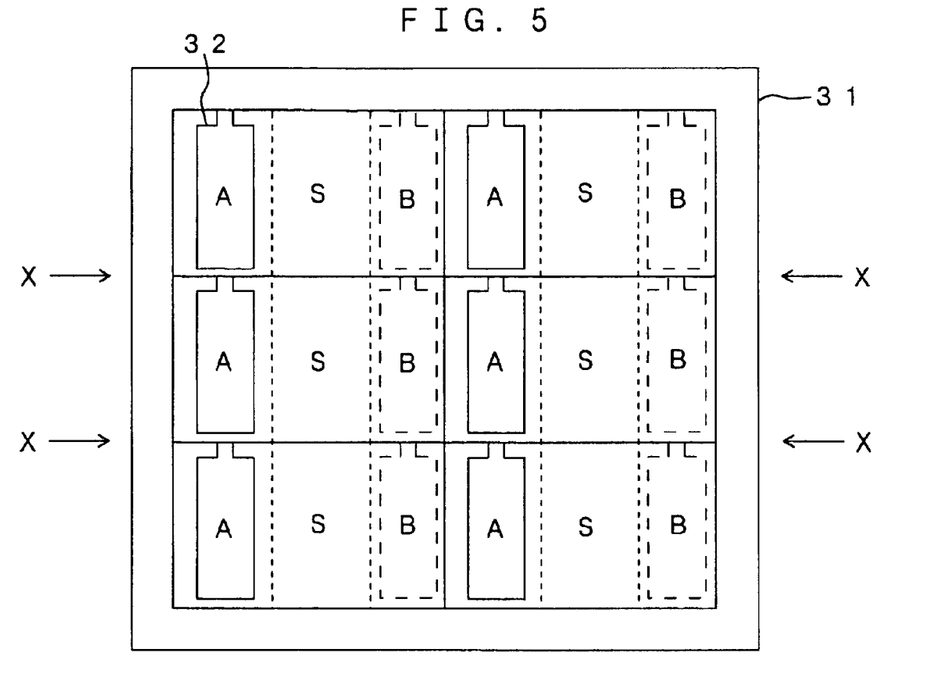
FIG. 5 is a plan view showing a state during production of a liquid crystal display for which a large glass substrate is used during the production of the liquid crystal display according to the embodiment of the invention.

In addition, a liquid crystal display according to the invention can also be produced by the following method. A glass substrate 31 having a large area as shown in the plan view of FIG. 5 is prepared. In an example illustrated therein, the size of the glass substrate 31 is such that, where one set consists of an area (A) corresponding to the surface glass substrate 9 of the liquid crystal displaying portion 11, an area (S) corresponding to the hard transparent substrate 3 of the circuit substrate portion 6, and an area (B) corresponding to the rear glass substrate 10 of the liquid crystal displaying portion 11, six sets thereof that are disposed in order can be produced.

LCD electrodes and conductive lines for electrode terminals are formed on the respective areas (A) and (B) of the above-described respective sets by using the ITO, etc., through the steps of photo mask resist, exposure, development, etching, and resist removal by a normal method. Also, LSI, etc., and electrode conductive lines for connecting electrically are formed on the area (S) by using ITO, etc., through the steps of photo mask resist, exposure, development, etching, and resist removal by a normal method.

Next, although not illustrated, a polyimide orientation film (which is used to cause the orientation of liquid crystal to be directed to a fixed direction) is coated, and the coated film is subjected to an orientation treatment by a rubbing method in compliance with a normal manner. Connecting electrically to paste for connection of the electrodes, which is formed on the areas (A) and (B), is printed. Thus, conductive line for forming a liquid crystal displaying screen is formed on the substrates (A) and (B).

In addition, in an example shown in FIG. 5, in a large glass substrate 31, a transparent electrode has six sets each set consisting of three areas (A), (S) and (B). However, it is possible to produce the transparent electrode with a single mask (not illustrated) by a single photolithography process.

Conventionally, one or two masks that are necessary for the area (A) corresponding to the surface glass substrate 9 of the liquid crystal displaying portion 11 and the area (B) corresponding to the rear glass substrate 10 thereof, and one mask necessary for the area (S) corresponding to the transparent substrate 3 for the circuit substrate 6, two or three in total, are produced in advance, respectively. And, exposure and patterning processes are carried out substrate by substrate. However, with the present invention, a single mask is prepared, wherein conductive lines of the liquid displaying portion 11 and circuit substrate portion 6 can be produced, by using the single mask, through the one-time exposure process and patterning process.

Next, a sealing agent 32 is coated on the area (A) by a printing method. This is because spacing is secured, through which liquid crystal is poured between the areas (A) and (B) that are brought about by overlapping two glass substrates 31 and 31.

Prior to overlapping the areas (A) and (B), a number of gap agents whose diameter is uniform to secure spacing into which the above-described liquid crystal is poured are sprayed in the area (A) or (B) that is placed on a worktable (not illustrated). And, after two glass substrates 31 and 31 are overlapped so that, as shown in the sectional view of FIG. 6(a), the order of arrangement of the above-described areas (A), (S) and (B) are made reverse, the sealing agent 32 is thermally hardened.

Next, the overlapped two glass substrates 31 and 31 are cut off (primary cutting) along the line shown by X—X in FIG. 5. A plurality of laminated plates, which are units for producing liquid crystal displays disposed in parallel in lateral lines as shown in FIG. 7(a), are obtained from the glass substrates 31 and 31 thus obtained.

Figure 7:
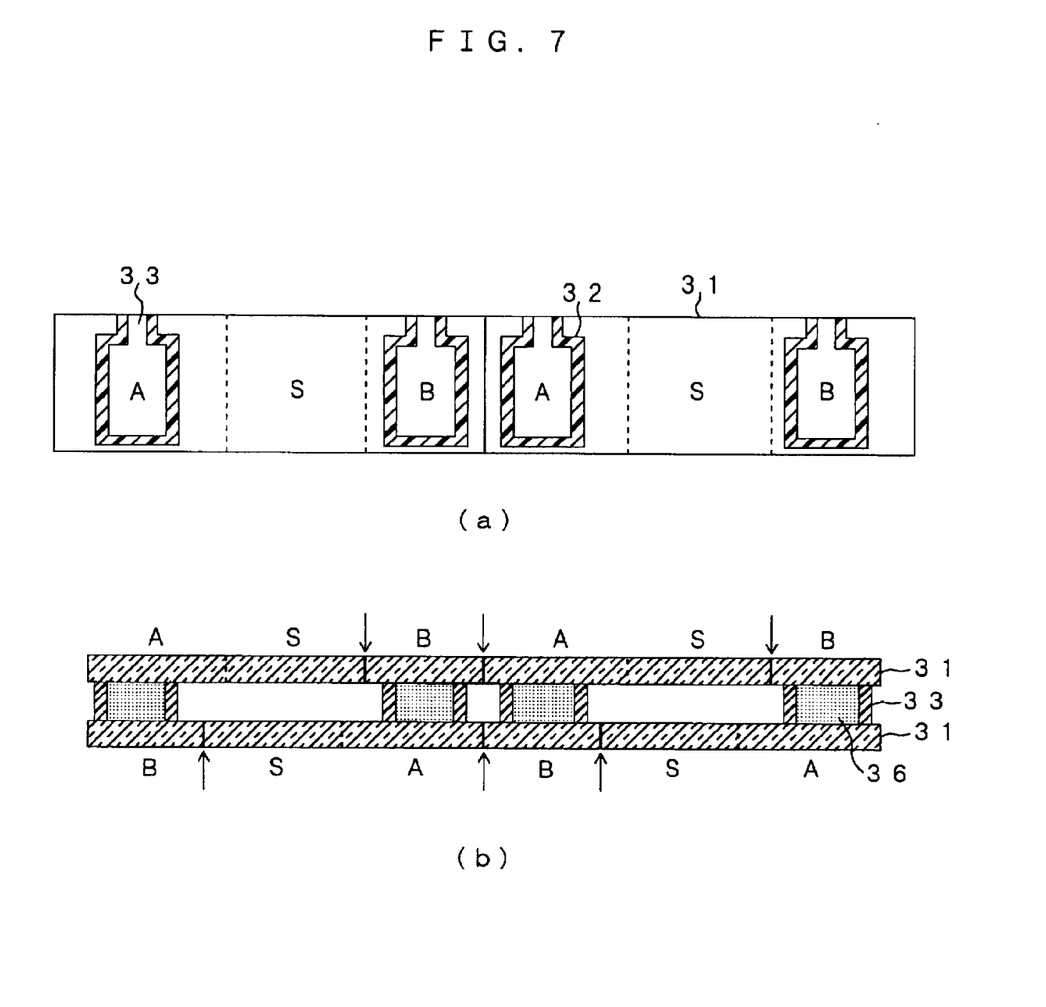
FIG. 7(a) is a plan view showing a state of producing the liquid crystal display for which a large glass substrata is used according to the embodiment of the invention.
FIG. 7(b) is a sectional view showing a state prior to cutting and separating into respective liquid crystal displays after liquid crystal is poured.

Liquid crystal 36 is poured from the liquid crystal pouring portion 33 of the sealing agent of the respective units for producing liquid crystal displays disposed in a row, which are shown in FIG. 7(a), to spacing enclosed by the sealing agent between the areas (A) and (B), thereby forming a liquid crystal displaying portion 11. FIG. 7(b) shows a sectional view of the glass substrates 31 and 31 after liquid crystal 36 is poured.

In addition, since the conductive terminal portion of the pixel electrodes of the area (A) is formed in the area (S), the corresponding terminal is connected to the gold bump 22 of the LSI 5 (See FIG. 4) in order to obtain a circuit substrate portion 6.

Figure 6:
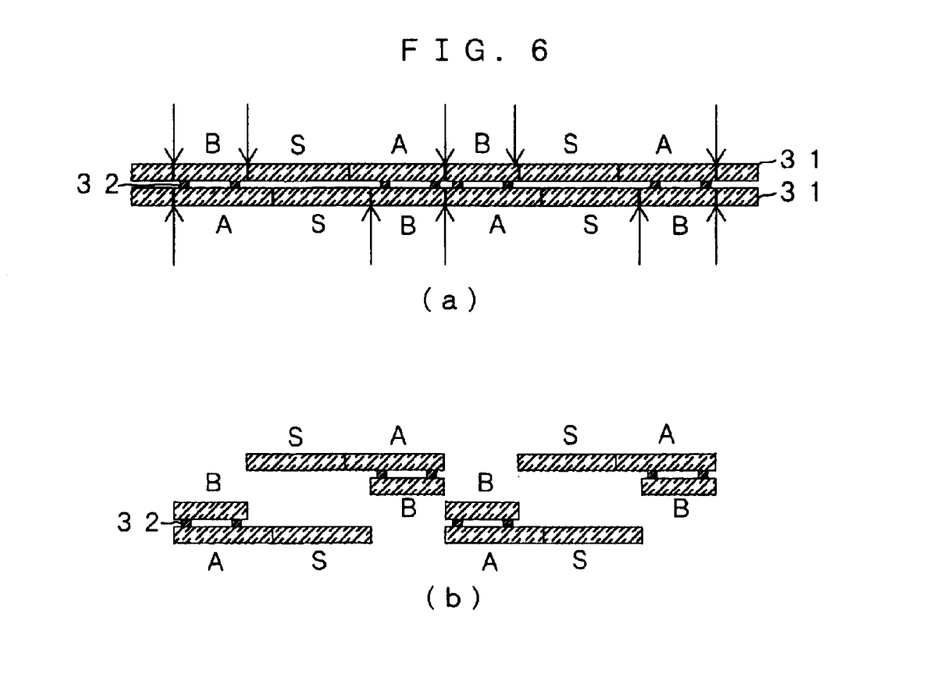
FIG. 6(a) is a sectional view showing a state during production of a liquid crystal display in which a large glass substrate is used to produce the liquid crystal display according to the embodiment of the invention.
FIG. 6(b) shows a state where the large glass substrate is cut off and separated into the respective units of producing the respective liquid crystal displays.

After that, where the liquid crystal displaying portion 11 and the circuit substrate portion 6 are cut off and separated (secondary cutting) at the position shown by the arrow markings in FIG. 6(b) and FIG. 7(b), the liquid crystal displaying portion 11 (corresponding to the areas (A) and (B)) and the circuit substrate portion 6 (corresponding to the area (S)) are separated so as to be integrated, wherein four liquid crystal displays 15 can be produced at one time.

Figure 8:
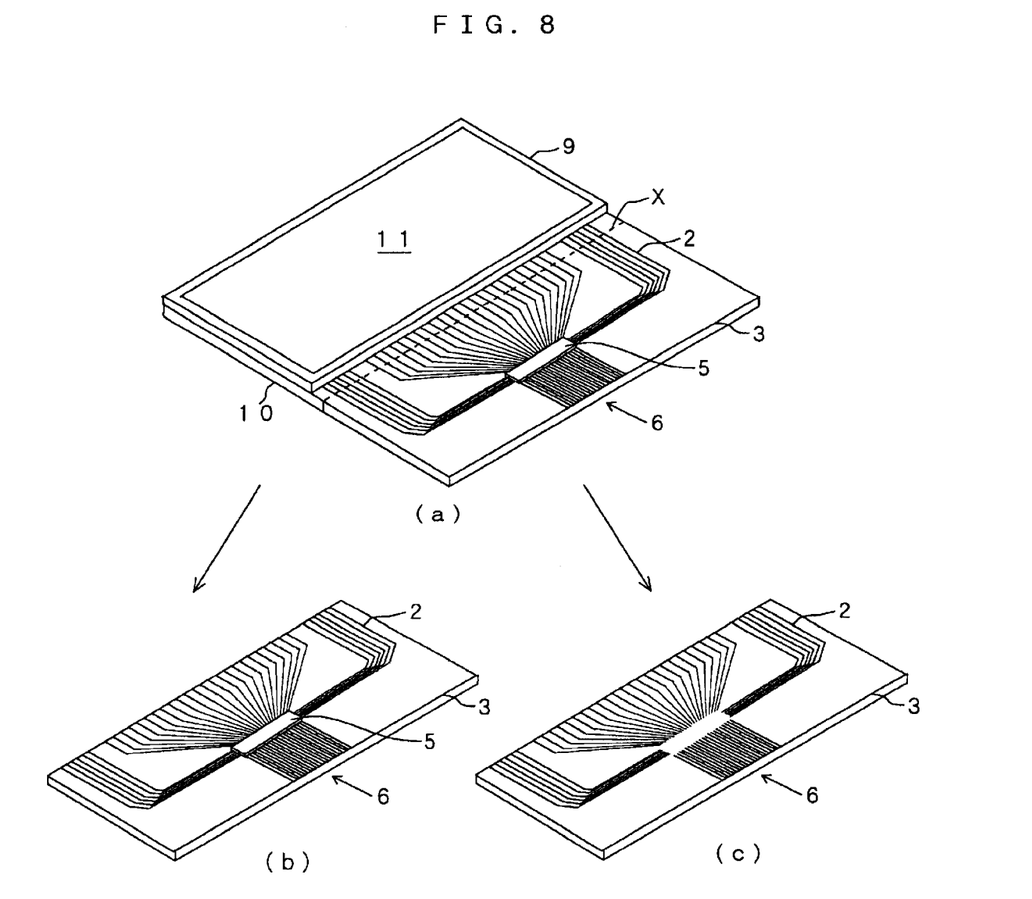
FIG. 8(a) is a perspective view showing a state prior to cutting the liquid crystal displaying portion of a unit for producing a liquid crystal display according to the embodiment of the invention from the circuit substrate portion thereof.
FIG. 8(b) is a perspective view showing a state where LSIs are mounted on the cut circuit substrate portion.
FIG. 8(c) is a perspective view showing a state prior to mounting the LSIs on the circuit substrate portion.

Further, as shown in FIG. 8(a), the liquid crystal displaying portion 11 and the circuit substrate portion 6 are cut off at the position shown with the dashed line X (FIG. 8(b)). Also, it is described that the LSI 5 is mounted after the above-described secondary cutting. However, where the liquid crystal displaying portion 11 and the circuit substrate portion 6 are cut off at the position shown with the dotted line X after the secondary cutting (see FIG. 8(c)), herein, the LSI 5 may be mounted on the circuit substrate portion 6.

Herein, where the LSI 5 is mounted on the circuit substrate portion 6, checking of the lighting of the liquid crystal displaying portion 11 and inspection of connecting electrically to the LSI 5 of a COG stick substrate (circuit substrate portion 6) are separately carried out.

Next, as shown in a perspective view of the liquid crystal display 15 in FIG. 9, the liquid crystal displaying portion 11 and the circuit substrate 6 are connected to each other by the FPC 7.

Still further, as shown in a perspective view of the liquid crystal display 15 in FIG. 1, by bending the FPC 7 so that the surface glass substrate 9 is disposed outside, a compact liquid crystal display 15 can be obtained.

By coating an infrared ray shielding film (not illustrated) on the surface other than the mounted portion of the LSI 5 of the transparent substrate 3 of the circuit substrate portion 6, a portable device that can be used outdoors, and a device that is exposed to sunlight when being used can be prevented from being subjected to any erroneous operation. For example, a tin oxide or indium tin oxide (ITO) film is coated so that its thickness becomes 20 ohms per square meter or less, whereby the transmissivity at a wavelength area of 830 nm is made into 20% or less, and the irradiation intensity of infrared rays to the LSI 5 can be decreased.

What is claimed is:

1. A liquid crystal display comprising:

a liquid crystal displaying portion in which a first substrate having a transparent pixel electrode provided thereon and a second substrate having a transparent opposed pixel electrode provided thereon overlap each other so that both said electrodes are disposed so as to be opposed to each other, and liquid crystal is sealed in a pixel area between said first substrate and said second substrate;

a circuit substrate portion that is mounted on a surface of a hard transparent substrate having a transparent conductive electrode provided thereon; and is provided with integrated circuit chips connected electrically to said transparent conductive electrode; and flexible connecting means for electrically connecting the transparent pixel electrode of said liquid crystal displaying portion with the transparent conductive electrode of said circuit substrate portion;

wherein said liquid crystal displaying portion and said circuit substrate portion are folded over at a middle part of said flexible connecting means so as to overlap each other.

2. The liquid crystal display as set forth in claim 1, wherein the surface on which the integrated circuit chips of said hard transparent substrate is disposed so as to face said liquid crystal displaying portion.

3. The liquid crystal display as set forth in claim 1, wherein said flexible connecting means is any one of a flexible printed circuit (FPC), a heat seal, a flexible flat cable (FFC) and an anisotropic conductive rubber connector.

4. The liquid crystal display as set forth in any one of claims 1, 3, and 4, wherein any one of either said first substrate, second substrate and hard transparent substrate is composed of a transparent glass plate or transparent synthetic resin plate.

5. The liquid crystal display as set forth in claim 4, wherein the thicknesses of said first substrate, said second substrate and said hard transparent substrate are the same.

6. The liquid crystal display as set forth in claim 5, wherein said hard transparent substrate is coated with an infrared ray shielding film at a surface other than that on which the integrated circuit chips of said hard transparent substrate are mounted.

7. A liquid crystal display comprising:

a liquid crystal displaying portion in which a first substrate having a transparent pixel electrode provided thereon and a second substrate having a transparent opposed pixel electrode provided thereon overlap each other so that both said electrodes are disposed so as to be opposed to each other, and liquid crystal is sealed in a pixel area between said first substrate and said second substrate;

a circuit substrate portion that is mounted on a surface of a hard transparent substrate having a transparent conductive electrode provided thereon; and is provided with integrated circuit chips connected electrically to said transparent conductive electrode; and flexible connecting means for electrically connecting the transparent pixel electrode of said liquid crystal displaying portion with the transparent conductive electrode of said circuit substrate portion;

wherein the thicknesses of said first substrate, said second substrate and said hard transparent substrate are the same.

8. The liquid crystal display as set forth in claim 7 wherein any one of either said first substrate, second substrate and hard transparent substrate is composed of a transparent glass plate or transparent synthetic resin plate.

9. The liquid crystal display as set forth in any one of claim 7 or 8, wherein said hard transparent substrate is coated with an infrared ray shielding film at a surface other than that on which the integrated circuit chips of said hard transparent substrate are mounted.

* * * * *